US006852385B2

(12) United States Patent
Rattigan

(10) Patent No.: US 6,852,385 B2
(45) Date of Patent: Feb. 8, 2005

(54) SYSTEM AND METHOD FOR DISPLAYING A SAMPLE ILLUSTRATING AN APPEARANCE OF AN OBJECT

(75) Inventor: Paul J. Rattigan, Hudson, OH (US)

(73) Assignee: Colwell, Inc., Minneapolis, MN (US)

( * ) Notice: Subject to any disclaimer, the term of this patent is extended or adjusted under 35 U.S.C. 154(b) by 0 days.

(21) Appl. No.: 10/420,976

(22) Filed: Apr. 21, 2003

(65) Prior Publication Data

US 2004/0072023 A1 Apr. 15, 2004

Related U.S. Application Data

(60) Provisional application No. 60/417,922, filed on Oct. 11, 2002.

(51) Int. Cl.[7] .......................... B32B 3/06; A47G 35/00

(52) U.S. Cl. ......................... 428/99; 428/692; 428/693; 428/542.2

(58) Field of Search .......................... 428/99, 692, 693, 428/542.2, 900

(56) References Cited

U.S. PATENT DOCUMENTS

| | | | | |
|---|---|---|---|---|
| 1,837,743 A | | 12/1931 | Wilson et al. | |
| 1,839,972 A | | 1/1932 | Lang et al. | |
| 1,876,978 A | | 9/1932 | Lang et al. | |
| 2,494,072 A | | 1/1950 | Vetterli | |
| 2,748,798 A | | 6/1956 | Stuart et al. | |
| 2,828,554 A | | 4/1958 | Harris | |
| 3,124,501 A | | 3/1964 | Wise | |
| 3,124,725 A | * | 3/1964 | Leguillon | 335/303 |
| 4,663,874 A | | 5/1987 | Sano et al. | |
| 5,158,324 A | | 10/1992 | Flesher | |
| 5,217,377 A | | 6/1993 | Little, Jr. | |
| 5,217,744 A | | 6/1993 | Little, Jr. | |
| 5,549,938 A | | 8/1996 | Nesbitt | |
| 5,663,746 A | | 9/1997 | Pellenberg et al. | |
| 5,931,522 A | | 8/1999 | Roskey | |
| 5,984,401 A | | 11/1999 | Hannah | |
| 5,994,990 A | | 11/1999 | Ogikubo | |
| 6,041,534 A | | 3/2000 | Buhler | |
| 6,217,958 B1 | | 4/2001 | Blyden et al. | |
| 2003/0024195 A1 | | 2/2003 | Koh et al. | |

FOREIGN PATENT DOCUMENTS

| | | |
|---|---|---|
| DE | 197 14 257 A1 | 11/1998 |
| GB | 1 248 401 | 10/1971 |
| GB | 1 386 888 | 3/1975 |
| GB | 1 458 975 | 12/1976 |
| GB | 2 294 147 A | 4/1996 |
| GB | 2 330 795 A | 5/1999 |
| GB | 2 361 654 A | 10/2001 |
| JP | 57-79883 | 4/1982 |
| JP | 59-149175 | 5/1984 |
| JP | 9-44095 | 2/1997 |
| JP | 2000-132131 | 5/2000 |
| JP | 2001-005395 | 1/2001 |

OTHER PUBLICATIONS

Advertisement for Magnetooli by Ars Metallica, *The Washington Post*, p. F5, Jul. 10, 1995.

* cited by examiner

*Primary Examiner*—Stevan A. Resan
(74) *Attorney, Agent, or Firm*—Merchant & Gould P.C.

(57) ABSTRACT

An improved system and method for displaying a sample representing an appearance of a surface of an object. The method may include providing laminations having a flexible magnetic layer and a flexible paint sample layer. The laminations are selectively placed on the ferromagnetic body with the magnetic layer adjacent to the body such that the lamination is detachably attached to the body while the paint sample layer is displayed thereon. The lamination can be placed on flat and/or curved portions of the body. When placed on curved portions, the lamination flexibly bends thereon and assumes the shape of the curved portion. The system and method are also applicable in a variety of other contexts to provide sample appearances of various aspects of an object.

3 Claims, 3 Drawing Sheets

FIG.1
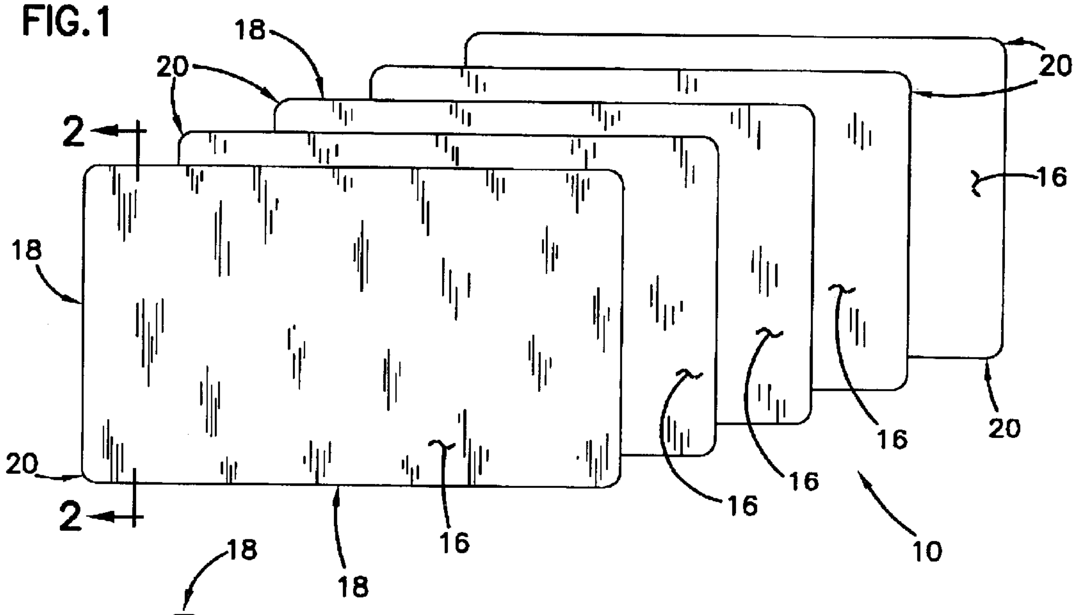
FIG.2
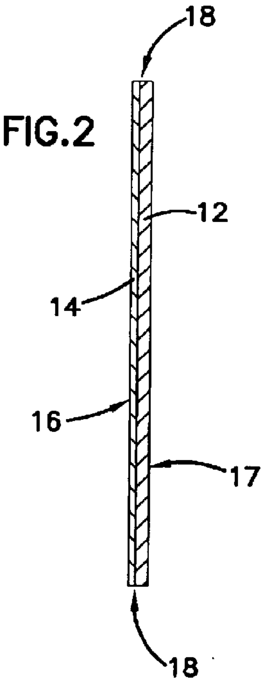
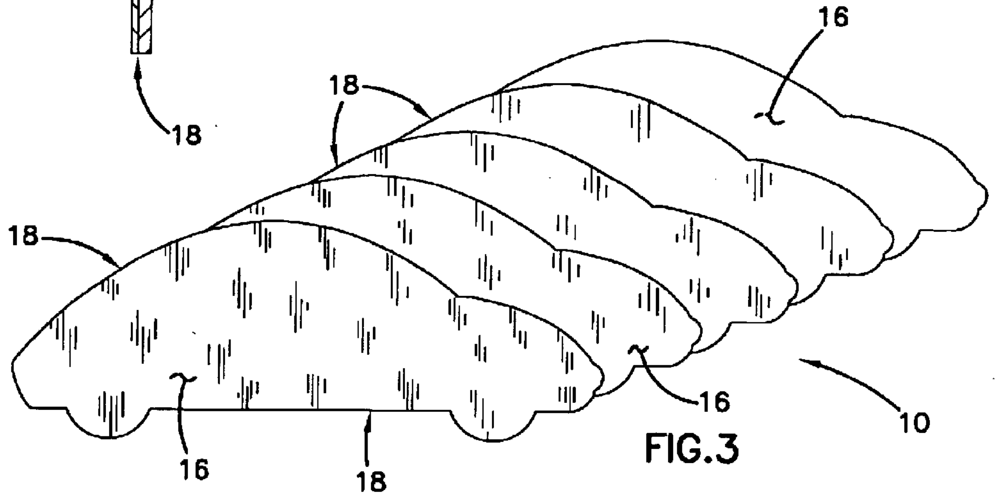
FIG.3

SYSTEM AND METHOD FOR DISPLAYING A SAMPLE ILLUSTRATING AN APPEARANCE OF AN OBJECT

RELATED APPLICATION

This application claims the benefit under Title 35, United States Code § 119(e), of U.S. Patent Provisional Application Ser. No. 60/417,922, filed Oct. 11, 2002 and entitled "System and Method for Displaying a Sample Illustrating an Appearance of an Object."

TECHNICAL FIELD

The present invention relates to samples providing an indication of appearance. More particularly, the present invention relates to improved systems and methods for displaying a sample representing the appearance of a surface of an object, for example, for the purpose of assisting a potential user or buyer to envision the object with various surfaces.

BACKGROUND OF THE INVENTION

Paint color samples and chips have been and are currently widely used for displaying and depicting to consumers various types and colors of paints for houses, buildings, vehicles, etc. Typically, the samples of representative paints are placed on small paper sheets or swatches and/or are integrated in brochures for depicting to the consumer the available paints or colorants for a particular product. For example, vehicles such as automobiles and trucks as made available by a manufacturer each year are provided in a number of different types and colors of paints.

Samples of these paints are often provided in brochures, which are made available to the consumer by dealers of the particular vehicles. Because dealers are unable to and often do not stock each available vehicle in each available paint, consumers rely on the available paint samples for making a decision as to the desired type and/or color of paint for the vehicle. It can be difficult for an observer to envision the appearance of a vehicle body in a particular type or color of paint by merely viewing the paint sample chip or swatch individually or in a brochure. It is also difficult for an observer to discern whether combinations of colors, or combinations of colors along with other surfaces such as carpeting and/or interior seat coverings, are aesthetically desirable.

More recently, metallic paints and other paints have been developed that change or have a differing appearance relative to the viewing angle and/or the curvature or other shape of the vehicle body. As can be appreciated, it is yet more difficult for a typical consumer to envision the overall appearance of a vehicle body painted with these types of paints with the currently available paint samples.

Accordingly, a need exists for an improved means of displaying a representative color sample, as well as other samples representative of the appearance of the surface or other aspects of an object.

BRIEF SUMMARY OF THE INVENTION

The present invention relates to samples providing an indication of appearance. More particularly, the present invention relates to improved systems and methods for displaying a sample representing the appearance of a surface of an object, for example, for the purpose of assisting a potential user or buyer to envision the object with various surfaces.

In one aspect, the invention relates to a process of displaying a plurality of surfaces available for selection of a product, the process including: providing a plurality of samples, each of the plurality of samples representing a coating available for selection of a product and having a flexible magnetic layer and a flexible sample layer; and placing at least one of said samples on a ferromagnetic body with said magnetic layer adjacent thereto, such that the coatings represented by said sample is displayed on a surface of the body.

In another aspect, the invention relates to a method for presenting coatings available for a product, the method including: providing a plurality of samples, each sample including a coating representative of a coating available for a product on a front surface and a ferromagnetic back surface; providing a ferromagnetic surface capable of displaying a sample from the plurality of samples; and placing one or more samples from the plurality of samples on the ferromagnetic surface for review.

In yet another aspect, the invention relates to a system for selecting from a plurality of samples representing coatings available on a product, the system including a plurality of samples, each sample including a first surface representing a coating available for a product and a ferromagnetic second surface, and a third ferromagnetic surface configured to detachably receive one or more of the plurality of samples, wherein one or more of the plurality of samples is selected and placed onto the ferromagnetic surface to assist in selecting a desired coating.

The above summary is not intended to describe each disclosed embodiment or every implementation. The figures and the detailed description which follow more particularly exemplify these embodiments.

BRIEF DESCRIPTION OF THE DRAWINGS

The above-mentioned and other features and objects of this invention and the manner of obtaining them will become more apparent and the invention itself will be better understood by reference to the following description of embodiments of the invention taken in conjunction with the accompanying drawings, wherein:

FIG. 1 is a perspective view of a plurality of laminations of samples constructed in accordance with the principles of the present invention;

FIG. 2 is a cross-sectional view taken generally along line 2—2 of FIG. 1 of a lamination;

FIG. 3 is a perspective view of a plurality of laminations of samples constructed in accordance with the principles of the present invention, and wherein the perimeter edge of each lamination is shaped generally depicting an outline of a vehicle;

Figure 4:
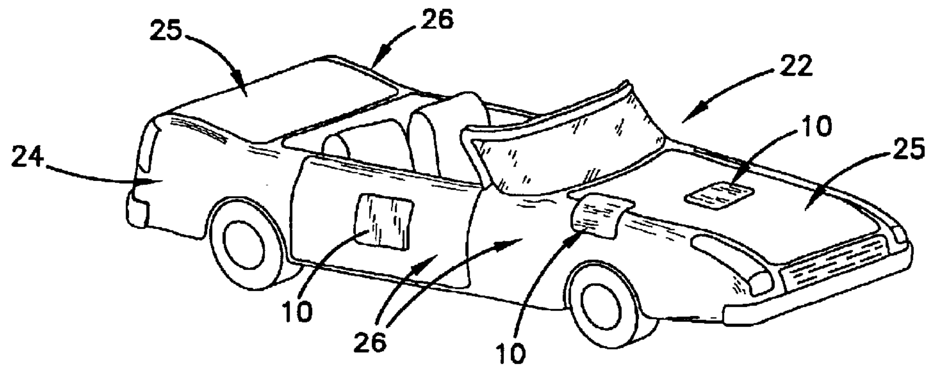
FIG. 4 is a perspective view of a vehicle and showing the placement of sample laminations thereon in accordance with the principles of the present invention.

Corresponding reference characters indicate corresponding parts throughout the several views of the drawings. The examples set out herein illustrate embodiments of the invention in one form thereof and such examples are not to be construed as limiting the scope of the disclosure or the scope of the invention in any manner.

DETAILED DESCRIPTION OF SPECIFIC EMBODIMENTS

The present invention relates to samples providing an indication of appearance. More particularly, the present invention relates to improved systems and methods for displaying a sample embodying an aspect of a representative appearance of an object.

Throughout various portions of the disclosure, the embodiments are described with reference to representing a paint and/or color. However, these embodiments are examples only. As describe below, other embodiments may include, for example, representations of other coatings, textures, fabrics, shapes, or the like.

Referring initially to FIGS. 1 and 2 illustrating a disclosed embodiment, there are shown a plurality of samples, in the illustrated embodiment laminations 10, constructed in accordance with the principles of the present invention. Laminations 10 include a coupling layer, illustrated in the example embodiment as magnetic layer 12. The laminations 10 also include a sample layer, which, in the example embodiment depicted in FIGS. 1 and 2, is color layer 14. As described more fully below, the sample layer may include a variety of other desired sampling material, such as, for example, fabric, vinyl, and/or leather, as well as indicate other characteristics of an appearance of an object, such as texture. Color layer 14 may be applied to the magnetic layer 12 by painting thereon. In the alternative, color layer 14 can be applied to a substrate such as paper or plastic and, thereafter, the substrate layer attached to the magnetic layer with an adhesive.

Although the term "lamination" is used, it is not necessary in some embodiments for the various layers, such as 12 and 14, comprising the lamination 10 to be firmly united. In some embodiments, the various layers comprising the lamination 10 may be only loosely coupled to one another.

Figure 5:
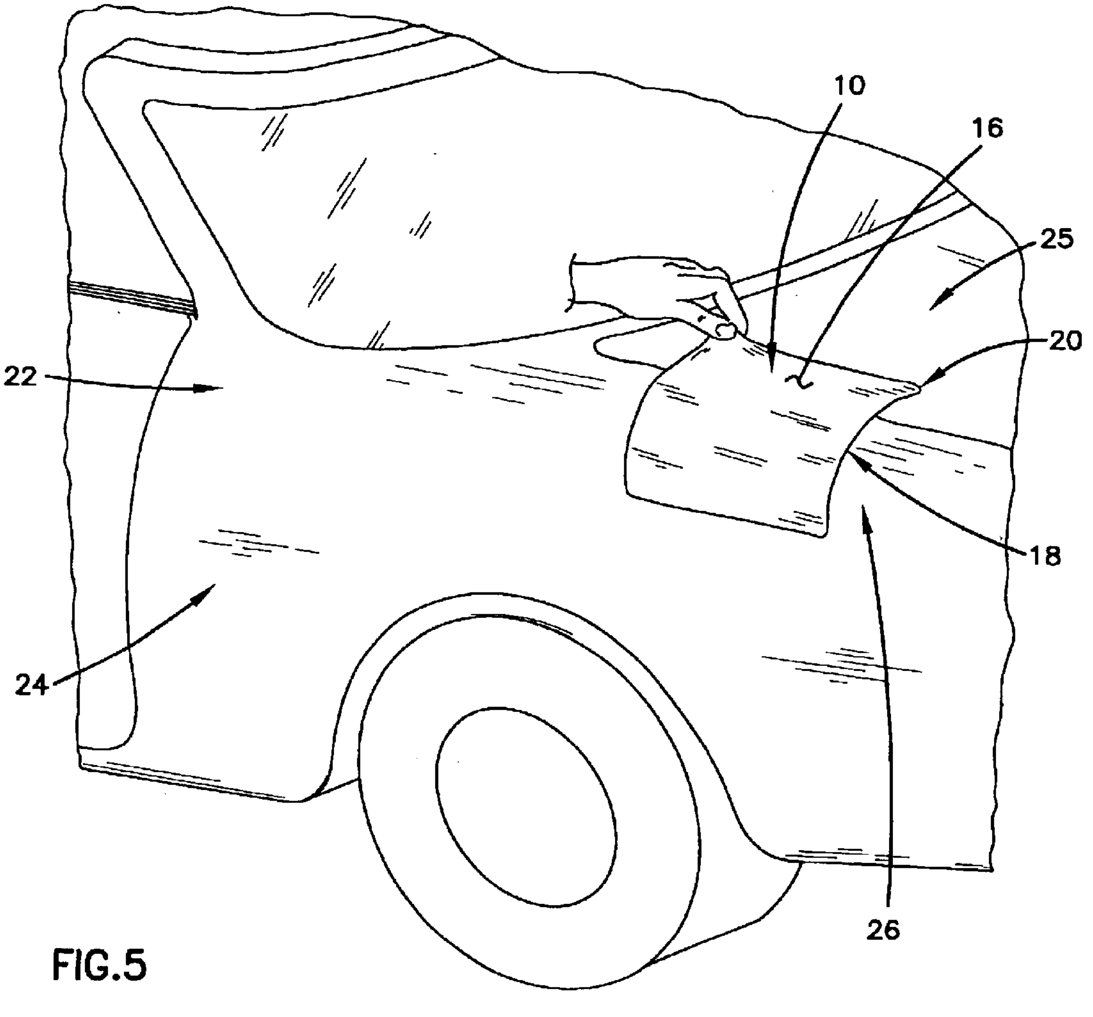
FIG. 5 is a perspective view of a vehicle and a sample lamination on a curved portion of the vehicle body, the sample lamination being partially removed.

Alternatively, other coatings or materials may be applied over the color layer 14 to protect the layer and/or alter the appearance of the surface. For example, a clear plastic coating or other polyester film, such as Mylar®, may be applied over the color layer 12 to protect and/or enhance the color layer 12. In this embodiment, the magnetic layer 12, the color layer 14, and other layers that may be used are flexible or pliable so as to bend over curved portions 26 of a vehicle body 24 as shown in FIGS. 4 and 5 and discussed herein below.

The color layer 14 includes an outer surface 16 that is viewed by the consumer. Each of the plurality of laminations 10 is provided with a different type of color layer 14 such that each of the paint surfaces 16 thereof depicts the desired different types and colors of paint. Color layer 14 may essentially be a representative sample of an available paint for a vehicle. Color layer 14 can be a metallic paint and/or other types of paints that have an appearance that differs relative to the viewing angle thereof such as, for example, when lamination 10 is bent into a curve or other shape. Additional layers of coatings or materials may be applied to further alter the appearance.

The outer or rear surface 17 of magnetic layer 12, as well as the perimeter edge 18, are smooth and free of any sharp edges or surface characteristics that could potentially scratch the paint on a vehicle body.

Each of the laminations is sufficiently large for thereby providing a sufficient representative viewable paint surface 16 for depicting or accurately representing the type and color of paint. In the example embodiment, the laminations 10 are provided with a perimeter edge 18 that is rectangular in shape and having generally rounded corners 20. The laminations 10 in the example embodiment are at least 5 inches by 7 inches, although laminations of larger or small dimensions are also possible. In an alternative embodiment, as shown in FIG. 3, the perimeter edge 18 is cut into a shape depicting a shape representative of a vehicle. Other shapes may be selected for aesthetic purposes, to enhance visualization, and/or to enhance the marketing presentation.

As shown in FIGS. 4 and 5, laminations 10 may be used for displaying the sample color layer 14 directly on a vehicle such as that shown and generally depicted by the numeral 22. Vehicle 22 includes a body or outer shell 24 made of a plurality of steel/ferromagnetic panels in a known and customary manner. The ferromagnetic body panels can include flat portions 25 such as the hood, and rounded or curved portions 26 such as the door and fender quarter panels.

For displaying a sample, one or more of the laminations 10 are placed anywhere on the vehicle ferromagnetic body 24 and as desired on generally flat portions 25 and/or generally curved portions 26 thereof. Alternatively, the laminations may be applied to a surface representative of the object depicted. When applying a lamination 10 on a surface, as best shown in FIG. 5, the lamination may be configured to flexibly bend thereon and assume the shape of the object. For example, the lamination 10 flexibly bends and may assume the curved shape 26 and/or any other contours of the vehicle body 24. As can be appreciated, because vehicle body 24 is made of a ferromagnetic material such as steel, when placing lamination 10 thereon as shown with the magnetic layer 12 and rear surface 17 adjacent or on the body 24, lamination 10 is essentially detachably attached to the vehicle while the surface 16 of the color layer 14 is displayed thereon. Therefore, each lamination 10 can be attached, repositioned, and removed from the vehicle body 24. This enables, for example, viewing of each lamination 10 from a variety of positions and angles.

Figure 6:
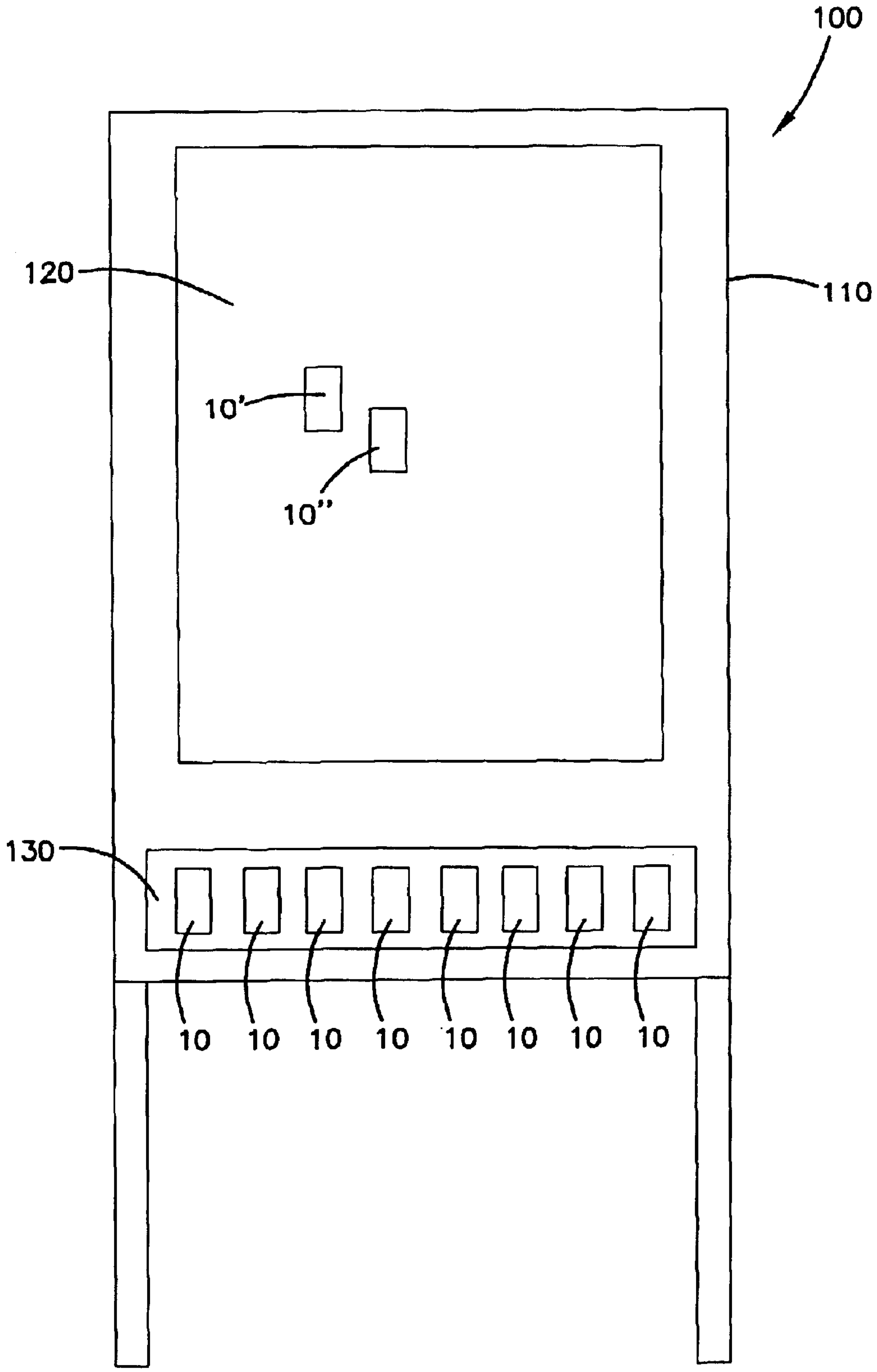
FIG. 6 is a schematic view of an example display including a workspace and a plurality of sample laminations placed thereon in accordance with the principles of the present invention.

Referring now to FIG. 6, an example display 100 is illustrated. The example display 100 generally includes a stand 110, a workspace 120, and a holder 130 including a plurality of laminations 10. The holder 130 may be made of steel or another ferromagnetic material so that the laminations 10 may be placed on the holder 130 for storage. In addition, the workspace 120 may also include a ferromagnetic material 120 so that each of the laminations 10 may be detachably coupled to the workspace 120 as desired. See, for example, laminations 10' and 10" that are shown detachably coupled to the workspace 120.

The workspace 120 of the display 100 may be used so that a lamination 10 or various combinations of the laminations 10 may be attached and removed to assist in visualizing the appearance of different combinations or aspects of an object such as color and texture. For example, the display 100 may be used in conjunction with the embodiment including the vehicle 22 described above. The laminations 10 may be removed from the holder 130 and placed on the vehicle body 24. In addition, the laminations 10 may be placed on the workspace 120 as well. The holder 130 may provide a convenient place to store the laminations 10 when not in use.

The sample layer 14 may be used to indicate more than an appearance of various paints or coatings. For example and without limitation, the sample layer 14 may include fabric, vinyl, or leather samples that provide an indication of appearance, including color, texture, style, etc. In the embodiment described above with respect to the vehicle 22, the laminations 10 may include sample layers 14 providing different options for fabric, vinyl, and/or leather interiors for the vehicle 22, as well as for the color options for the exterior. In this manner, different combinations of interior and exterior colors and textures can be sampled through placement on the vehicle body 24 and/or the workspace 120.

The coupling layer 12 may also be made of materials other than a ferromagnetic material. For example and without limitation, other removably-fastening materials such as “hook and loop” fasteners (e.g., Velcro®) or repositionable adhesives may be used.

In another embodiment, samples are provided on laminations for different colors associated with blinds available for a home. Using the display 100, the various laminations including the sample colors for the blinds may be viewed. Further, different colors of paints available for interiors of a home may also be provided on additional laminations, so that samples of the colors for one feature, such as blinds, may be viewed along with samples of another feature, such as interior paint colors, so that the coordination (or lack thereof) between the surfaces represented can be visualized and evaluated. Other applications are also possible.

In another example embodiment, the samples may be used to provide a visualization of shape as well as general appearance such as color and texture. For example, the laminations may be sized and shaped to replicate various graphics available for a vehicle. In one embodiment, full-sized laminations of various “racing stripes” available for a vehicle are provided. The racing stripes may be removably placed on the vehicle to provide an indication of appearance, assisting a user or buyer in deciding whether to select a vehicle with that feature.

In another embodiment, each laminate 10 may include representations of a plurality of different colors on the surface 16. For example, each laminate may include representations of two colors to represent a two-tone configuration. Other variations are also possible.

In another embodiment, a plurality of colors represented by the sample layer on each of a plurality of laminates may be selected according to a color scheme. Further, each color represented by the sample layer of each laminate may be formed as an “accurate” color, meaning that the color represented has been selected to approximate the color provided on the actual product that the sample represents. For example, an accurate color on a surface of a laminate may be achieve using spectroanalysis to match the color represented by the sample layer with the actual color of the product.

An example method for displaying and presenting the laminations may generally include providing a plurality of laminations, each lamination including a coating representative of a coating available for a product on a front surface and a ferromagnetic back surface. A ferromagnetic surface is also provided that is capable of displaying a sample. For example, the ferromagnetic surface may be a vehicle (see, e.g., FIGS. 4 and 5) or a display (see, e.g., FIG. 6). Next, one or more of the laminations are placed on the ferromagnetic surface for review.

The method may also involve a user applying and removing a plurality of laminations in order to visualize the appearance of various combinations of colors, for example. One or more of the laminations may also be repositioned at different points on the ferromagnetic surface relative to other laminations. The method may also include grouping various laminations, as desired, to identify different combinations of colors or textures.

Finally, when a user is finished with the plurality of laminations, the laminations may remain on the ferromagnetic surface or may be retained together at, for example, the holder 130 for later use.

While the invention has been described as having specific embodiments, it will be understood that it is capable of further modification. This application is, therefore, intended to cover any variations, uses or adaptations of the invention following the general principles thereof and including such departures from the present disclosure as come within known or customary practice in the art to which this invention pertains and fall within the limits of the appended claims.

What is claimed is:

1. A system for selecting from a plurality of samples representing exterior colors available for a vehicle, the system comprising a plurality of samples, each sample including a first surface representing an accurate color available for a vehicle, and a ferromagnetic second surface, and each sample being flexible to conform to a body of the vehicle, wherein each of the plurality of samples is configured to be selected and placed on the body of the vehicle so that the second surface is detachably coupled to the vehicle to assist in selecting a desired color of the vehicle, and further including a plurality of interior samples, the plurality of interior samples each including a first surface representing either an interior color or fabric available for the vehicle, and a ferromagnetic second surface, and each sample being flexible to conform to the body of the vehicle.

2. A method of presenting coatings available for a vehicle, comprising:

providing a plurality of samples, each sample including a coating representative of a coating available for the vehicle on a flexible front surface and a flexible magnetic back surface;

providing a vehicle including a ferromagnetic outer surface;

applying the magnetic back surface of a first sample from the plurality of samples onto a first portion of the outer surface of the vehicle such that the first sample follows a contour of the first portion of the outer surface and the coating on the front surface of the first sample is visible;

removing the first sample from the vehicle;

reapplying the magnetic back surface of the first sample from the plurality of samples onto a second portion of the outer surface of the vehicle such that the first sample follows a contour of the second portion of the outer surface and the coating on the front surface of the first sample is visible; and selecting a coating for the vehicle based at least in part on the coating on the front surface of the first sample.

3. The method of claim 2, further comprising:

removing the first sample from the vehicle; and applying the magnetic back surface of a second sample from the plurality at samples onto the first portion of the outer surface of the vehicle such that the second sample follows the contour of the first portion of the outer surface and the coating on the from surface of the second sample is visible.

* * * * *